United States Patent Office 3,286,007
Patented Nov. 15, 1966

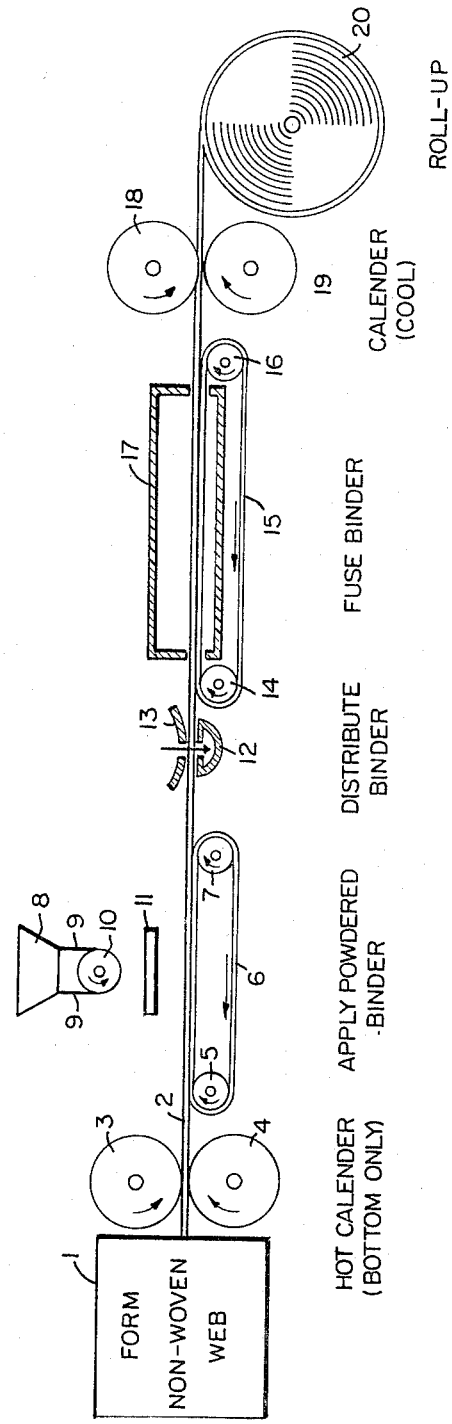

3,286,007
PROCESS OF MANUFACTURING A POLYOLEFIN
FIBER-CONTAINING NON-WOVEN FABRIC
Robert Campbell Wilkie, Millis, Albert Gerard Hoyle, Lowell, and Leo John De Roche, Medfield, Mass., assignors to Ludlow Corporation, Needham Heights, Mass., a corporation of Massachusetts
Filed June 25, 1965, Ser. No. 466,982
10 Claims. (Cl. 264—119)

This application is a continuation-in-part of S.N. 397,989, filed September 21, 1964, now abandoned.

This invention pertains to a process for the manufacture of a non-woven fabric containing a substantial amount of a thermoplastic polymer fiber, e.g. polypropylene fiber. The fiber content of the fabric is randomly but securely bonded with discrete particles of a fused thermoplastic resin, such as a polyethylene resin, and one surface of the fabric is smooth and dense as compared to the balance of the fabric, with the thermoplastic fiber content at the surface being partly heat-fused, independently of the binder particles, into a coherent but porous fiber matrix.

Woven jute has long commanded the market for tufted carpet prime backings. Jute, however, is a natural fiber supplied from abroad and its price and availability fluctuate. Among other defects, such as unevenness of strand structure, poor fungus and microbial resistance, the woven structure of the jute backings deflects the tufting needles causing irregularities in the spacing of the tufts and uneven tuft bind, and the backings undergo dimensional changes during tufting, piece dyeing and in use. Despite their drawbacks, woven jute backings have been accepted up to now because of the widths available and favorable price.

Much emphasis has recently been placed by the industry on the development of a prime backing based on domestically produced synthetic fibers, particularly a non-woven backing made with such fibers. It has been realized that if properly made with the synthetic fibers being adequately bonded, a random non-woven web would have a uniformity of properties throughout the web that would greatly reduce or eliminate needle deflection during the tufting operation, especially if it did not require reinforcement with a woven material. A non-woven would also impart to the finished carpet a multidirectional strength that would be particularly valuable in the laying of the carpet and help prevent stretching and distortion in use. Until the present invention, however, a random fiber-laid non-woven backing had not been made that reasonably equalled the overall performance offered by the jute backings at a competitive price.

The non-woven backings so far made available to the trade have been dimensionally weak and thus require reinforcement in some manner, usually with a woven material. This unavoidably increases the cost of the composite product. A woven reinforcement such as a scrim still causes needle deflection to some extent and its strength is by no means uniform in all directions.

Prime backings having excellent physical properties have been made from 100 percent of woven synthetic thermoplastic fibers such as nylon, Dacron and Acrilan, but the price of these fibers makes them unattractive. Much attention has been given to the use of the polyolefin fibers, such as polypropylene, because of their availability and price, high flex resistance, good tensile strength and rot and fungus resistance, but until the present invention, satisfactory results have not been obtained with the polyolefin fibers in a non-woven structure because of the difficulty of securing good fiber bonding. While the type, denier, length and strength of the fibers are factors that help to determine the overall strength and performance of a non-woven fabric, the controlling factor is the strength of a fiber bonds created by the bonding agent. The needling density during the tufting of a carpet is so great that many fiber bonds, and perhaps the fibers themselves if they have low impact resistance, will break and as a result a major portion of the strength of the non-woven will be lost along with a loss in the ability of the non-woven to provide adequate tuft bind.

The random non-woven tufted carpet prime backing produced by the process of this invention overcomes these and other problems. The prime backing has a uniformity of physical properties in all directions within its plane that makes it particularly receptive to tufting. It is dimensionally stable, tough and resistance to delamination, but nevertheless resilient and flexible, and it has the very unusual ability to undergo normal tufting without any appreciable change in dimension, either in width or length, with the result that there is virtually no distortion or irregularity induced in the finished carpet. No other type of prime backing is known to have this ability. It will also accept piece dyeing without significant dimensional change. This resistance to change of dimension is not, however, at the expense of needle penetration, needle deflection or failure to close about the yarn when the needle is withdrawn during tufting. The improved properties can be in large part attributed to the nature of the binder used and to the manner in which the binder is incorporated into the web.

In addition, the prime backing is light in weight, rot and fungus resistant, unaffected by humidity changes, and can be tufted from either side without difficulty, although it is preferred for certain reasons to tuft from one side. The holes caused by the tufting are small and close back about the yarn which permits more tufts per inch. The prime backing is also heat formable which is an additional advantage for some applications, such as for automotive carpeting.

In brief compass, the process of this invention comprises forming a non-woven web in any convenient manner, the fiber content of which consists of at least 25 weight percent, and preferably predominantly, of a thermoplastic polymer fiber uniformly distributed therethrough, immediately hot calendering one surface thereof to smooth and densify the surface and to partly fuse the thermoplastic polymer fibers at the surface into a loose, porous but coherent fiber matrix while leaving the balance of the fibers in the web in a relatively expanded, interlocked but unbonded state. The web may be compacted at this point to about ⅓ to ⅔ of its original thickness. This calendering step is important in that it imparts adequate handleability to the web and prepares it for the subsequent processing, especially the incorporation of the binder.

The next step of the process consists of incorporating the binder, which is a powdered thermo-responsive resin having a fusing or melting temperature below that of the thermoplastic polymer fiber. The powdered resin is dusted onto the open, uncompacted side of the web and caused to settle into the interstices of the web in a uniform manner. The web is thereafter heated to melt the resin particles, with however, the temperatures of the thermoplastic fiber being maintained below its melting point. While the binder particles are still in a tacky to molten condition, the web is subjected to calendering to impress points of fiber-fiber contact into the molten resin particles, with the temperature of the calendering being sufficiently low to cause the resin particles to set and harden.

The resulting fabric product is quite unusual. It is a combination of plastic and textile materials processed in such a unique manner that the fabric does not have the distinctive properties of either plastic sheeting or of woven fabric, while nevertheless possessing the most desirable features of each. The structure may be described as a discontinuous plastic matrix consisting of small isolated masses of plastic particles, or plastic "islands," joined together by discrete fibers, there being considerable fiber length between particles. Ideally, some portion of every fiber, at a point of overlap with another fiber, is embedded into and passed through one of the fused particles of the resin binder, becomes free for some distance and then is similarly embedded in another particle of the resin binder.

This structure of randomly distributed areas of plastic bonding and free-fiber areas gives a balance of physical and aesthetic properties different from that found in other non-wovens, for example those bonded with a latex impregnate which tend to give a film-like bond which extends along the length of the fibers. Greater filament movement or mobility is permitted in the present construction. This permits maximum utilization of fiber strength and improves the flexibility of the fabric. If crimped fibers are used, this provides additional free-fiber length between the sites of bonding so that the tear strength and flexibility of the fabric is further improved. The fibers are capable of movement when the fabric is needled and are not rigidly locked into place which would cause them to be sheared instead of displaced by the needles.

The thermoplastic fiber-containing non-woven web can be formed by any convenient method such as by carding, by garnetting with cross-laying, by needling or by the recently developed process for forming webs from continuous filaments as disclosed in United States Patent No. 3,169,899. It is very definitely preferred, however, to use random fiber-laid or air-laid webs because the resulting product is substantially isotropic, which is not the case with carded or garnetted webs. While the process of this invention will be particularly described with reference to random air-laid webs and in connection with the manufacture of a tufted carpet prime backing, a particularly preferred product form, it will be understood that the invention on a broad basis encompasses other methods of forming the web and the manufacture of other types of fabrics such as clothing interliners, drapery fabrics, tarpaulin substitutes, lampshades and the like.

One of the distinctive features of the present process is that two thermoplastic materials are used, the fiber and the resin binder, with the former having a slightly higher melting point. The thermoplastic fibers on one surface of the web are partly heat-fused to prepare the web for further processing and this necessarily must be accomplished in the absence of the lower melting resin binder. The powder resin binder is then added and in turn heat fused to secure the desired random bonding of the fibers, which fusing must necessarily be carried out below the melting point of the thermoplastic fibers.

Attempts have been made in the past to make non-woven fabrics bonded with heat fusible powders, but the results have not been satisfactory, probably because of difficulty of controlling the uniform distribution of the resin binder particles within the non-woven. One of the features of the present process is that the initial partial fusing of one face of the non-woven web materially assists in securing the subsequent uniform distribution of the powdered binder within the web.

It is important to note that the resin binder is introduced into the web in particulate form and not as a latex. Latex materials tend to cause film-like bonding, and not the desired globular or nodular type of bonding. The size of the resin particles is selected to form the desired size of fused globules around the points of fiber-fiber contact. Too fine a particle size causes insufficient resin to be present at the points of bonding. Too large a size, besides being wasteful, causes the fabric to have an unduly gritty hand, and when the fabric is to be used as a tufted carpet prime backing, materially interfers with the passage of the tufting needles through the fabric. The resin binder is essentially free from water solubilizing agents or dispersants. This is important for some applications. For example, in the case of prime backings, when the tufted material is subjected to piece dyeing or the like, it has been found that presence of dispersants of the type used in a resin latex, causes the binder, and consequently the fabric, to disintegrate. The binder can contain antioxidants, stabilizers, dyes, materials to facilitate needling, and the like so long as they do not make the binder prone to attack by water or solvents.

The tufted carpet prime backing made in a preferred embodiment of this invention comprises a bonded random non-woven fabric, the fiber content of which comprises at least 55 weight percent of a thermoplastic polymer fiber, preferably a polypropylene which is tough as measured by the area under its stress-strain curve, and has a life preferably of at least 100,000 cycles in accordance with the Flex Cycles of Failure of Fiber Test described in Caswell, Textile Fibers, Yarns and Fabrics, page 57 (Reinhold Publishing Corporation, 1953). Since the fabric is to be needled, the fibers need to be tough, i.e., have the ability to deform under high speed impact and recover. The polypropylene preferably has a softening point of at least 250° F. and a minimum melting point of at least 300° F.

While polypropylene is at present of particular interest, those skilled in the art will appreciate that other thermoplastic fibers of comparable price and physical properties are equally suitable. Low cost regenerated or waste nylon fibers or polyethylene fibers would, for example, be suitable.

The thermoplastic fibers can amount in some cases to 100 percent of the fiber content of the web. In a preferred embodiment, however, the non-woven fibers consist also of hydrophilic fibers, preferably cellulosic fibers, e.g., viscose rayon in amounts in the range of 5 to 45 weight percent.

The denier, the length and the density of the fibers are selected to have the proper web formation characteristics.

After the non-woven web of polyolefin fibers is formed, one surface of one web is hot calendered so that the polyolefin fibers at that surface are at least in part fused and compacted into a loose, porous fiber matrix. The fiber web then is loaded with a thermoplastic binder in amounts in the range of 10 to 100, preferably 40 to 90, weight percent based on dry fibers. The binder is, preferably, a polyethylene having a melting point below the melting point of the polyolefin fibers, but not below 212° F. The thermoplastic binder is introduced into the web as a powder and is uniformly dispersed within the web. The web is thereafter heated as in an oven to melt the binder and then immediately cold calendered to impress the fibers, especially the cellulosic fibers into the globules of the binder.

Cellulosic fibers are used in the non-woven web of the preferred embodiment wherein the thermoplastic fibers are polypropylene fibers and the web is subsequently bonded with discrete particles of a thermoplastic resin. This is because presently available polypropylene fibers do not bond well with most thermoplastic resin binders. A well bonded matrix is difficult to secure with 100 percent polypropylene fibers. Polypropylene and similar polyolefin fibers may well be produced in the future, however, with some variations in the resin itself or in the nature of the surface of the fiber that will make them more receptive to bonding to other materials. For the present, a sufficient amount of cellulosic fiber is used to give a fiber matrix thereof which, when bonded with a thermoplastic binder, encompasses and binds the polyolefin fibers and imparts additional strength to the overall non-woven prime backing. However, if an undue amount of the cellulosic fiber is used the properties of the non-woven prime backing deteriorate because the cellulosic fibers have poor impact and flex resistance and do not accept needling. An amount of cellulosic fibers in the range of about 5 to 45, preferably 17 to 25, weight percent on total fibers has been found to be about optimum in obtaining proper balance between adequate fiber bonding and formation of a locking matrix, and deterioration of properties, especially during tufting. The cellulosic fibers also contribute dyeability and other desirable properties to the non-woven prime backing. In this connection, some dyed or colored fiber can be incorporated into the non-woven to give it an off-white color, and/or the thermoplastic binder can be pigmented.

One of the advantages of the process of this invention is that it does not induce any bow or skew in the product. Also tenter frames, which are required when handling a scrim, are not needed. Another advantage is that high production rates, well in excess of 50 feet per minute, are readily achieved. Such high rates cannot be achieved in other types of processes, such as in weaving jute or in cross laying a carded material. It will be appreciated that this process is quite versatile in that it can be changed over to use various combinations of fibers and to produce various weights of fabric with a minimum of difficulty.

This invention will become clear from the following description and example made with reference to the drawing attached to and forming part of this specification. The drawing schematically illustrates the process of this invention.

Table I below summarizes the proportion of the constituents that can be used in the prime backing made according to this invention and gives a specific example.

TABLE I.—CONSTITUENTS OF PRIME BACKING

| | Preferred Range | Example |
|---|---|---|
| Fiber Content: | | |
| Thermoplastic wt. percent on total fiber. | 55 to 100 | 80.[1] |
| Length, inches | 1 to 4½ | 2.5. |
| D/F (Denier per filament) | 4½ to 30 | 15. |
| Flex resistance, cycles | Above 100,000 | Above 100,000. |
| Softening Point, °F | Above 250 | 280. |
| Melting Point, °F | Above 300 | 333. |
| Cellulosic, wt. percent on total fiber. | 0 to 45 [3] | 20.[2] |
| Length, inches | 1 to 4½ | 1%6.[4] |
| D/F | 3 to 30 | 5½.[4] |
| Binder Content: | | |
| Thermoplastic resin, wt. percent on dry fiber. | 10 to 100 | 55.[5] |
| Melt Index | 0.2 to 90 | 22. |
| Melting Point, °F [6] | 212° [6] | 233.6°. |
| Density | 0.91 to 0.99 | 0.923. |
| Mesh size (U.S. Standard Sieve).[7] | 16 to 200 | 35. |
| Finished Web: | | |
| Weight, oz./sq. yd | 3 to 10 | 7. |
| Thickness, inches | As desired | 0.025. |

[1] Polypropylene, crimped.
[2] Viscose Rayon, crimped.
[3] 17 to 25 appears to be optimum.
[4] 15 D/F and 3 inch length has also been satisfactorily used.
[5] Polyethylene (Microthene, U.S. Industrial Chemicals Co.) 70 wt. percent loadings have also been satisfactorily used.
[6] Upper limit is at least 5° F. less than softening point of polyolefin fiber.
[7] Mesh size passing all of powder; 25 to 50 mesh appears to be optimum Suitable thermoplastic fibers are those made from polyethylene, polybutene, polyisobutylene, polyvinyl chloride, polyamides, polyurethanes and the like, with polypropylene fibers being preferred. By polypropylene fibers, it is meant manufactured fibers in which the fiber forming substance is any long chain synthetic polymer composed of 85 to 100 percent of propylene units. The polymer can be isotactic, atactic, crystalline or amorphous in whole or in part. The olefin during polymerization can be reacted with other monomers to impart specific properties such as surface finish and the like.

The fibers can have any desired shape, such as flat, round, oval or square with the round shape being preferred. The deniers given refer to the largest dimension of the fiber in cross-section. Low, medium or regular draw fibers can be used and the fibers are preferably crimped. The fibers should be selected to provide controlled give or flexing to allow for fiber displacement by the needles during tufting and thus minimize bond or fiber rupture.

The hydrophilic fibers can be of any conventional type used in non-wovens such as cotton or ethylene-vinyl acetate copolymer fibers. The viscose rayon fibers are preferred because of their availability and price.

With reference to the drawing, the first step of the process consists of forming a non-woven web having the proper fiber content in a conventional manner using, for example, the equipment described on pages 11–19 of Buresh, Non-Woven Fabrics (Reinhold Publishing Corp., 1962).

Immediately after its formation, one surface of the web, the lower surface as illustrated, is hot calendered to fuse, at least in part, but not totally, the thermoplastic fiber content on that surface into a porous but coherent fiber matrix. To do this, the web 2 is passed through rolls 3 and 4. Roll 4 has a polytetrafluoroethylene or other non-stick finish and is heated to about 300–325° F. The rolls are gapped slightly, preferably in the range of 2–40 mils. The amount of fusing is sufficient to impart a somewhat crusty surface to the web bottom and to compact the web to about ⅓ to ⅔ of its original thickness. The temperature used during calendering should not be too high as undue shrinkage may occur at this point. Shrinkages below about 10, and preferably 5, percent are preferred.

The web after this hot calendering step is then passed to the next step for application of the powdered resinous binder. Because the undersurface of the web has been hot calendered, the web is particularly receptive to being filled with a powdered binder. The web, after issuing from the calender stack, is carried on a supporting conveyor consisting of a belt 6 passed over rollers 5 and 7, one of which is driven. Positioned above the conveyor is a hopper 8 containing the powdered binder. Doctor blades 9 are positioned with respect to feed roll 10 to allow a selected maximum particle size to pass. Feed roll 10 can be smooth, knurled or fluted and the spacing of the doctor blades is adjusted as need be to assure the proper flow of powdered binder. Feed roll 10 is rotated at the proper speed for the desired rate of feed and the powder falls into a vibrating screen 11 which helps to distribute the powder uniformly over the width of the non-woven web. The powder after being applied in this manner for the most part rests on the upper surface of the web and it is necessary to uniformly distribute the powder within the interstices of the web.

The particle size of the powder binder should be selected consistent with the denier of the fibers being used and the spacing between the fibers of the web. For the particular example given in Table I a particle size which will entirely pass through a 25 to 50 mesh screen, e.g., 35 mesh U.S. Standard Sieve, has been found to be about optimum. The powder should have some spread in the particle size distribution to avoid undue stratification of the powder within the non-woven web. The particle size distribution of commercially available powders is usually satisfactory.

One method for achieving uniform distribution of the powder is to apply a vacuum to the underside of the web to cause air to flow therethrough. As illustrated, a vacuum bar 12 extends transversely across the width of the traveling web. The bar 12 has a narrow slit in it and air is thus drawn through the web as it passes over the vacuum bar. Placed immediately above the vacuum bar is an air guide 13 having a fine slit in it which directs air into the slot of the vacuum bar, thus assisting the direct flow of air through the web. This dispersing method results in surprisingly good distribution of the powdered binder within the web. The compacted partly fused underside of the web prevents the powder from passing completely through the web and also prevents the air flowing through the web from disarranging the fibers in the web.

Another method (not shown) of distributing the powder in the web is to have the web ride over a plate which is vibrating at a high frequency. Vibration at 36,000 cycles a second with 0.0045 inch amplitude in a forward and upward direction was satisfactorily employed in one case. Any binder that sifted through was carried forward on the plate and fell into a suitable collection trough. Mechanical agitation of the web as by passing it through cold calendering rolls can also be used to distribute the binder.

After the powder has been distributed in the web the web is passed through oven 17 on a conveyor belt 15 which passes over supporting rollers 14 and 16. The temperature of the web is raised in the oven above the melting point of the binder so that the binder melts.

During the fusing, the binder forms distinct molten globules on the fibers but most of these globules are not at the points of fiber-fiber contact. It is desirable, therefore, to mechanically impress the fibers into the molten binder. After the thermoplastic binder has been melted the web is passed to a cool calendering step, which consists of calender rolls 18 and 19. The rolls can be of steel or rubber, with the use of one rubber and one steel roll being preferred. The surface of the rolls are maintained at a temperature sufficiently low to assure that the resin binder solidifies and is sufficiently set to hold the fibers together as the web issued from the calender. If the binder is not cooled sufficiently the fibers may spring apart as they emerge from the calender. Generally speaking, the web is compacted to about $\frac{1}{15}$ to $\frac{1}{3}$ of its thickness just prior to this calendering. Some globules of the solidified binder still remain apparent after the calendering.

The web after calendering is usually still fairly hot and it can first be passed over conventional cooling cans or rolls (not shown) before being wound up on roll 20.

One might normally think that it would be desirable to have a considerable spread between the melting points of the resin binder and the thermoplastic fiber, as this would make the step of fusing the binder less critical. However, this assumption does not hold when the fabric is to be used as a prime backing. In a prime backing the melting point of the resin binder should be as high as possible because of the manner in which a tufted carpeting is processed. At some stage or other the carpeting is usually subjected to drying at elevated temperatures either to remove water and/or to cure a latex binder, for example, one used to attach the second backing. The ovens used for this drying are usually operated at quite high gas temperatures, often in excess of 250° F., to effect the drying, or curing, as rapidly as possible. The ovens are used to process a number of different carpet constructions, and it would be impracticable to segregate an oven line to specially process a fabric that could not take the higher temperatures that are normally used. Consequently, if the melting point of the binder is not high enough, it may unduly soften, or melt, when the backing is subjected to the customary drying conditions.

In the present case, oven 17 is preferably equipped to accomplish the heating of the web by directing a multiplicity of hot air blasts through the web. The temperature of the air blasts can be well above that of the melting point of the resin binder, even above that of the thermoplastic fiber, to minimize the time required for fusing the resin particles. It will be appreciated, however, that if the gas temperature used is above the melting point of the fiber the temperature of the web cannot be allowed to come into equilibrium with that of the hot air blasts. Instead, the timing of the exit of the web from the oven and the webs entrance into the calender must be such that the web temperature is intermediate of the melting points of the resin binder and thermoplastic fiber just prior to the time it enters the nip of the calender. In this connection, it has been observed that the first calendering step of partial fusing and compacting one side of the web cooperates with the bonder fusing step. If the surface of the web has not been partly fused, in the proper manner, lower air blast temperatures must be used in the oven to avoid unacceptable or catastrophic shrinkage of the web. With a web having a properly partly fused surface, however, considerably higher air blast temperatures can be used. While some slight shrinkage of fibers on the originally unfused side of the web is apparent in some instances, the partially fused surface seems to materially inhibit web collapse. Thus the initial densifying and partial fusing of the one surface permits a greater freedom in the processing of the web through the fusing oven. One could, of course, achieve the same effect as obtained with the oven 17 by a heated platen press or by compressing the web between heated endless belts, but it is believed that the air blast oven arrangement is the most efficient one for high speed processing.

Having described this invention, what is sought to be protected by Letters Patent is succinctly set forth in the following claims.

1. A process comprising the steps of:
    (a) forming a non-woven web the fiber content of which consists of at least 25 weight percent of a thermoplastic polymer fiber uniformly distributed therethrough;
    (b) heating one surface of said web, smoothing, compacting and densifying the fiber content thereof and fusing the thermoplastic fibers at said surface into a loose porous fiber matrix, while leaving the balance of the fibers in the web in a relatively expanded, interlocked but unbonded state;
    (c) distributing a thermo-responsive resin binder within the interstices of said web, said resin binder having a melting point below the melting point of said thermoplastic polymer fiber;
    (d) heating said web to a temperature sufficient to melt said resin binder but below that temperature at which said thermoplastic polymer fiber melts; and
    (e) compacting said web to impress the fibers thereof into said resin binder while simultaneously cooling said web to solidify said resin binder.

2. The process of claim 1 wherein said web is a random air-laid web, and wherein said thermo-responsive resin binder is applied in dry powdered form to the uncompacted side of said web.

3. The process of claim 2 wherein said thermoplastic polymer fiber is a polypropylene fiber and the fiber content of said web consists predominantly of said polypropylene fiber with the balance being a cellulosic fiber, and wherein said thermo-responsive resin binder is a polyethylene.

4. A process comprising, in combination, the steps of:
    (a) forming a random fiber-laid non-woven web the fiber content of which consists predominantly of a tough thermoplastic polymer fiber uniformly distributed through said web;
    (b) compacting, densifying and partly heat-fusing the thermoplastic polymer fiber content on one surface thereof while leaving said surface relatively porous;
    (c) dispersing within said web discrete particles of a thermo-responsive resin binder having a melting point below that of said thermoplastic polymer fiber;
    (d) melting said particles of thermo-responsive resin while maintaining the temperature of said thermoplastic polymer fiber below the melting point thereof; and (e) compacting said web and causing said particles of thermo-responsive resin to solidify.

5. The process of claim 4 wherein said melting of said particles is brought about with hot air blasts through said web using air temperatures significantly higher than the air temperatures that could be used if said one surface were not compacted, densified and partly heat fused.

6. The process of claim 4 wherein the fiber content of said web consists of crimped viscose rayon and polypropylene fibers with the latter predominating, and said thermo-responsive resin binder is a polyethylene and amounts to in the range of 10 to 100 weight percent on total fiber.

7. A process comprising the steps of forming a random fiber-laid non-woven web the fiber content of which comprises at least 55 weight percent of a thermoplastic fiber and at least 5 weight percent of a cellulosic fiber, hot calendering one side of said web and causing the thermoplastic fiber content at the surface thereof to at least in part fuse and compact, applying to the other side of said web a powdered thermoplastic resin binder, uniformly distributing said resin binder within said web, heat fusing said binder at a temperature below the melt temperature of said thermoplastic fiber, and while said binder is still in a soft to molten state calendering said web and cooling the same to impress the fibers in and to set said binder.

8. The process of claim 7 wherein said hot calendering is sufficient to impart handleability to the web without distortion but being less than that sufficient to cause a shrinkage of more than 10 percent.

9. A process for forming a tufted rug/carpet prime-backing comprising the steps of forming a random fiber-laid non-woven web the fiber content of which comprises at least 75 weight percent of a crimped tough polypropylene fiber having a high flex resistance and the balance being a crimped cellulosic fiber, hot calendering one side of said web and causing the polypropylene fiber content at the surface thereof to at least in part fuse and compact, dusting the other side of said web within the range of 10 to 100 weight percent on total fiber of a powdered thermoplastic resin binder having a melting point below the melting point of said polypropylene fiber, uniformly distributing said resin binder within said web, heat-fusing said binder at a temperature below the melt temperature of said propypropylene fiber and while said binder is still in a soft to molten state calendering said web and cooling the same to set said binder.

10. The process of claim 9 wherein said thermoplastic resin binder is a polyethylene having a density in the range of 0.91 to 0.99, a melt index in the range of 0.5 to 90, and a mesh size (U.S. Standard Sieve) in the range of 16 to 200.

References Cited by the Examiner

UNITED STATES PATENTS

| | | | |
|---|---|---|---|
| 3,067,469 | 12/1962 | Yarrison | 264—135 X |
| 3,088,859 | 5/1963 | Smith | 264—119 X |
| 3,100,733 | 8/1963 | Bundy | 264—126 X |
| 3,150,416 | 9/1964 | Such | 264—136 X |
| 3,200,181 | 8/1965 | Rudloff | 264—122 |

ROBERT F. WHITE, *Primary Examiner.*

R. B. MOFFITT, *Assistant Examiner.*